Jan. 2, 1951 M. CAMRAS 2,536,030

ELECTROMAGNETIC TRANSDUCER HEAD

Original Filed Dec. 5, 1946

Inventor
Marvin Camras by The Firm of Charles W. Hills Attys

Patented Jan. 2, 1951

2,536,030

UNITED STATES PATENT OFFICE 2,536,030

ELECTROMAGNETIC TRANSDUCER HEAD

Marvin Camras, Chicago, Ill., assignor to Armour Research Foundation of Illinois Institute of Technology, Chicago, Ill., a corporation of Illinois Original application December 5, 1946, Serial No. 714,286. Divided and this application June 6, 1947, Serial No. 752,989

3 Claims. (Cl. 179—100.2)

1

This invention relates to a magnetic recorder method and means, and more particularly, to a particularly effective structure for an electromagnetic head and to a novel method of magnetically recording fluctuating electric energy on a traveling record member and reproducing a magnetic recording from a traveling previously magnetized record member.

The particular novel electromagnetic head structure and the particular novel magnetic recording and reproducing method herein described and claimed has been found to be particularly effective in making a magnetic record on a moving picture film and reproducing the magnetic record therefrom.

One of the biggest problems in connection with making a magnetic record on a moving picture film lies in getting a sound track which is sufficiently large so as to enable a sufficient amount of energy to be recorded on the film without changing the conventional dimensions of the film. This difficulty has been extremely great in connection with 8 millimeter and 16 millimeter moving picture film.

One of the principal objects and features of the present invention is to provide a novel electromagnetic head for a traveling magnetic record member.

A further object of the present invention is to provide a novel method of magnetically recording and reproducing fluctuating electric energy.

A still further object of the present invention is to provide a novel sound head for an elongated flat record member, such, for example, as a film or tape.

Another and further object of the present invention is to provide a novel electromagnetic head for a tape record member having a magnetic sound track on two surfaces thereof disposed substantially at right angles to each other.

Another and still further object of the present invention is to provide a novel electromagnetic transducer head having a shoulder portion in the magnetic polar portion thereof over which the record member rides and in which two surfaces at right angles to each other are effective in magnetizing the record member or reproducing a record previously magnetically recorded on the record member.

Still another and further object of the present invention is to provide a novel erase head for a magnetic recorder.

This application is a division of my copending application entitled "Magnetic Record Member," U. S. Serial No. 714,286, filed December 5, 1946.

2

The novel features which I believe to be characteristic of my invention are set forth with particularity in the appended claims. My invention itself, however, both as to its organization and manner of construction and method of operation, together with further objects and advantages thereof, may best be understood by reference to the following description, taken in connection with the accompanying drawing, in which:

As the term will hereinafter be used, "electromagnetic head" will be used in a generic sense to designate either an erase head, a record head, or a reproducing head, or any combination thereof. The term "electromagnetic transducer head" will be employed to designate either a magnetic recording or a magnetic reproducing head or both.

Figure 1:
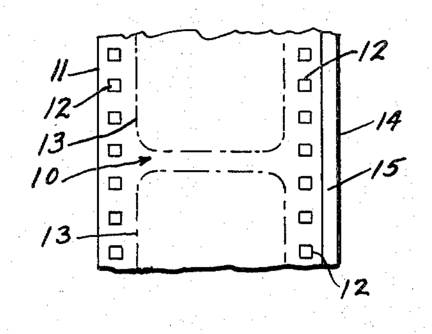
Figure 1 is a diagrammatic sketch of a piece of moving picture film.

While the novel principles of the present invention are not limited to a structure for use on moving picture film only or to a method of recording or reproducing a magnetic record on a moving picture film, they are particularly applicable to such. For that reason, there is illustrated in Figure 1 of the drawing, a moving picture film 10 which includes a main body portion 11 formed of cellulose nitrate or cellulose acetate and is provided with a series of sprocket holes 12 which are located between the picture frames 13 and an edge 14 of the film 10.

Figure 2:
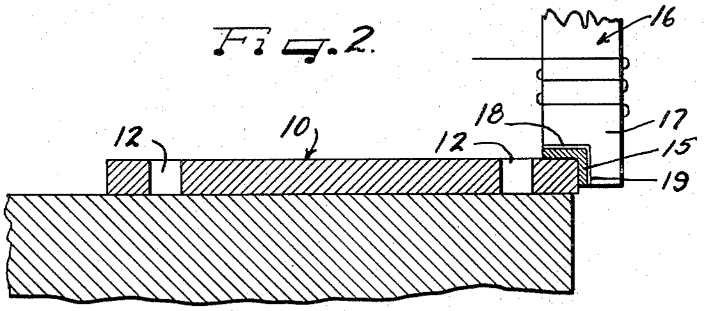
Figure 2 is a vertical sectional view of a film such as that illustrated in Figure 1 riding over an oil-damped flywheel and in engagement with an electromagnetic transducer head.
Figure 3:
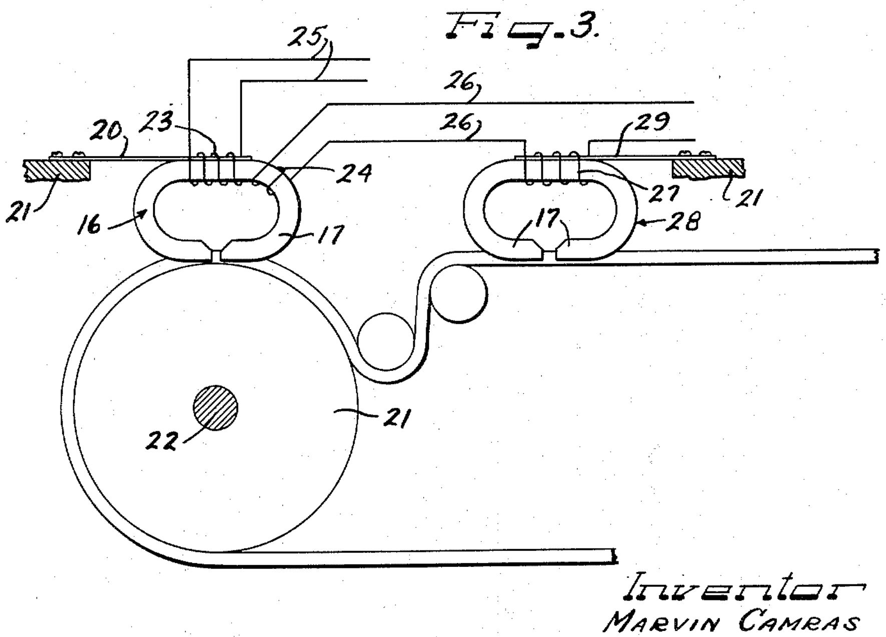
Figure 3 is a diagrammatic side view of an electromagnetic transducer head and erase head and the film with which they are associated.

As may be seen best in Figure 2 of the drawing, a magnetic sound track 15 is coated over a portion of the upper surface of the film 10 between the sprocket holes 12 and the edge 14 as well as around the adjacent corner and down over the edge surface of the film. This gives a substantial surface area for the magnetic sound track without the disadvantage of having to bring the sound track up to the edge of the sprocket holes 12.

As is well known to those skilled in the art, the punching of the sprocket holes 12 in the film 10 causes a stressing of the film in the immediate region of the sprocket holes which results in a very bad effect on the magnetic sound track 15 when the sound track is brought into this region of stress.

An electromagnetic transducer head 16 having a pair of polar portions 17 is arranged to ride on the sound track 15 of the film 10. These polar portions 17 include a longitudinally extending shoulder portion 18 having a side wall 19. The shoulder portion 18 is arranged to ride on top of the sound track 15, while the wall portion 19 is arranged to ride against the portion of the sound track 15 which lies over the side edge 14 of the film 10.

The electromagnetic transducer head 16 is spring-pressed by means of a leaf spring 20 or other suitable mounting mechanism which is carried on a supporting structure 21'. This spring means 20 resiliently urges the head 16 against the film as the film 10 rides over an inertia member 21 mounted for rotation on the axis 22. This inertia member may be an oil-damped flywheel or other suitable stabilizing member or capstan.

The electromagnetic transducer head 16 also includes a signal coil 23 and a high frequency biasing coil 24 which are, respectively, energized through conductors 25 and 26. The high frequency biasing coil 24 is preferably connected in series with an erase coil 27 which is mounted on an erase head 28 similar to the electromagnetic transducer head 16 but having a slightly larger spacing between the pole portions 17. The erase head 28 is also resiliently mounted on a leaf spring 29 carried on the supporting frame 21'.

It has been found that the above described arrangement and technique is so efficient that satisfactory results may be obtained even on 8 mm. film, notwithstanding the low speed and the extremely small size of the latter. It will also be observed that the inherent nature of the shouldered portions of the head structure is such that the head is self-aligned with the edge of the film.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. An electromagnetic transducer head comprising a core having a pair of confronting pole portions and a signal coil mounted on said core, said confronting pole portions each having a pair of magnetically excitable record member contacting surfaces of a rabbeted side edge of said core, said surfaces being disposed substantially at right angles to each other.

2. An electromagnetic transducer head including a pole portion for engagement with a record member, said pole portion having a substantially L-shape magnetically excitable contacting surface on a side edge of said transducer head so as to be simultaneously engageable with two adjacent sides of a record member.

3. A demagnetizing head including a pole portion for engagement with a record member, said pole portion having a substantially L-shape magnetically excitable contacting surface so disposed on a side edge of said pole portion as to be adaptable to simultaneous engagement with two adjacent sides of record members with which it is associated.

MARVIN CAMRAS.

REFERENCES CITED

The following references are of record in the file of this patent:

UNITED STATES PATENTS

| Number | Name | Date |
|---|---|---|
| 1,466,750 | Peterson | Sept. 4, 1923 |
| 2,272,821 | Roys | Feb. 10, 1942 |
| 2,361,753 | Eilenberger | Oct. 31, 1944 |
| 2,432,162 | Jones | Dec. 9, 1947 |
| 2,443,756 | Williams | June 22, 1948 |

FOREIGN PATENTS

| Number | Country | Date |
|---|---|---|
| 2,653 | Denmark | Dec. 1, 1898 |
| 617,796 | Germany | Aug. 28, 1935 |
| 512,766 | Great Britain | Nov. 30, 1937 |